Nov. 3, 1959   J. C. HENDERSON   2,911,047
APPARATUS FOR EXTRACTING NATURALLY OCCURRING
DIFFICULTLY FLOWABLE PETROLEUM OIL FROM
A NATURALLY LOCATED SUBTERRANEAN BODY
Filed March 11, 1958   3 Sheets-Sheet 1
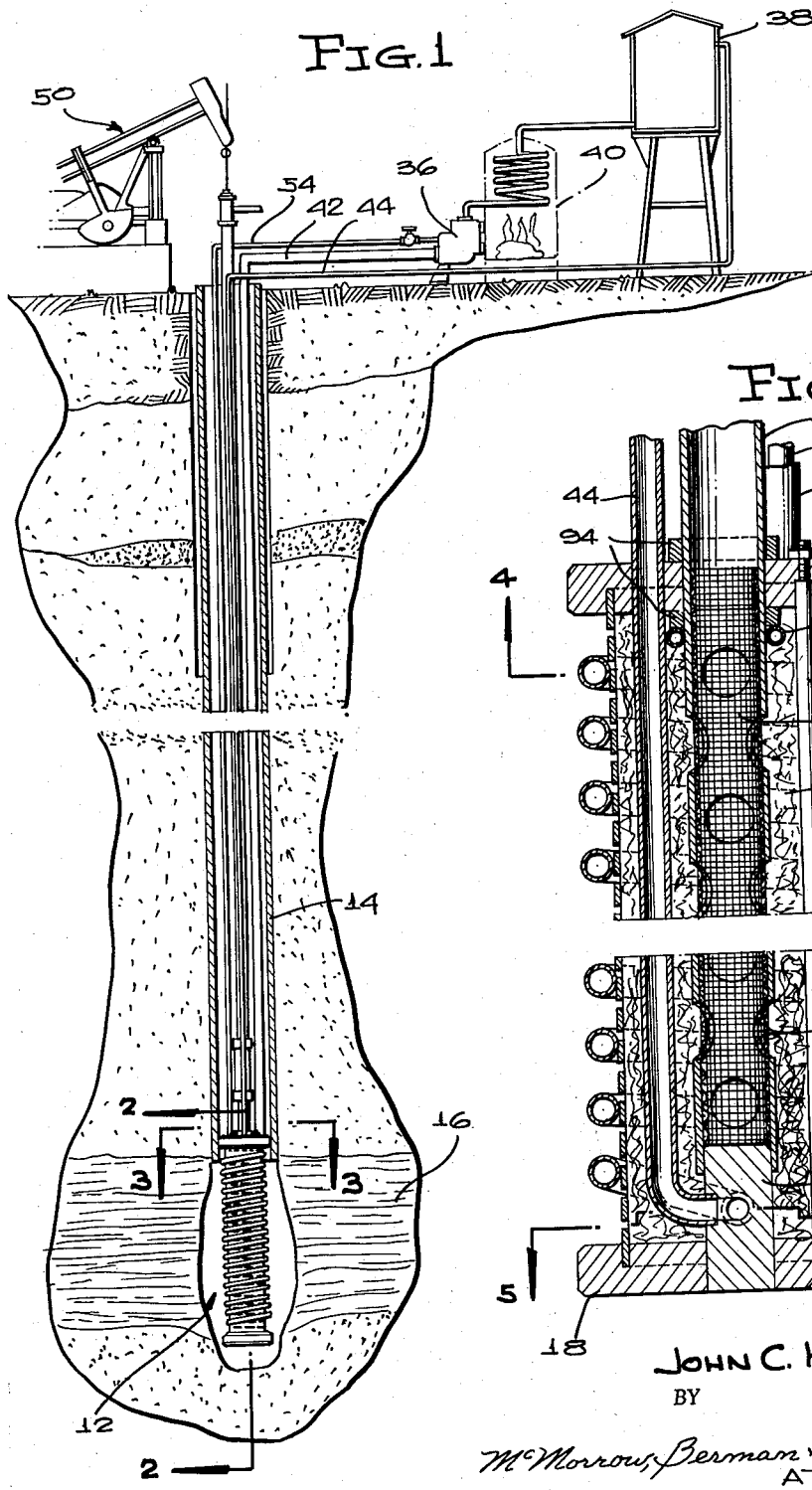
INVENTOR.
JOHN C. HENDERSON
BY
McMorrow, Berman & Davidson
ATTORNEYS

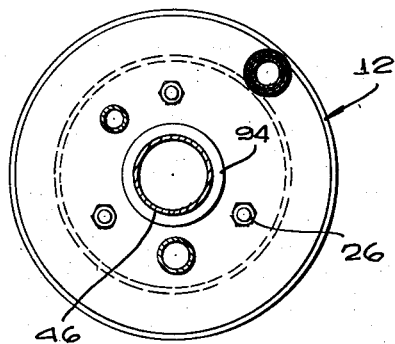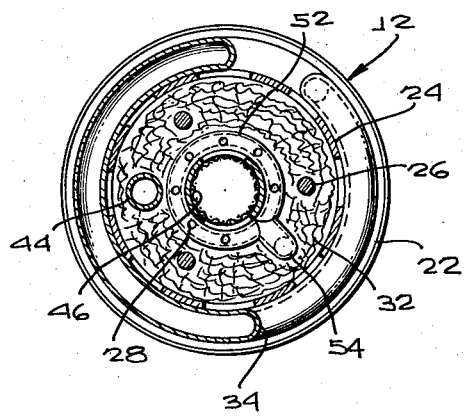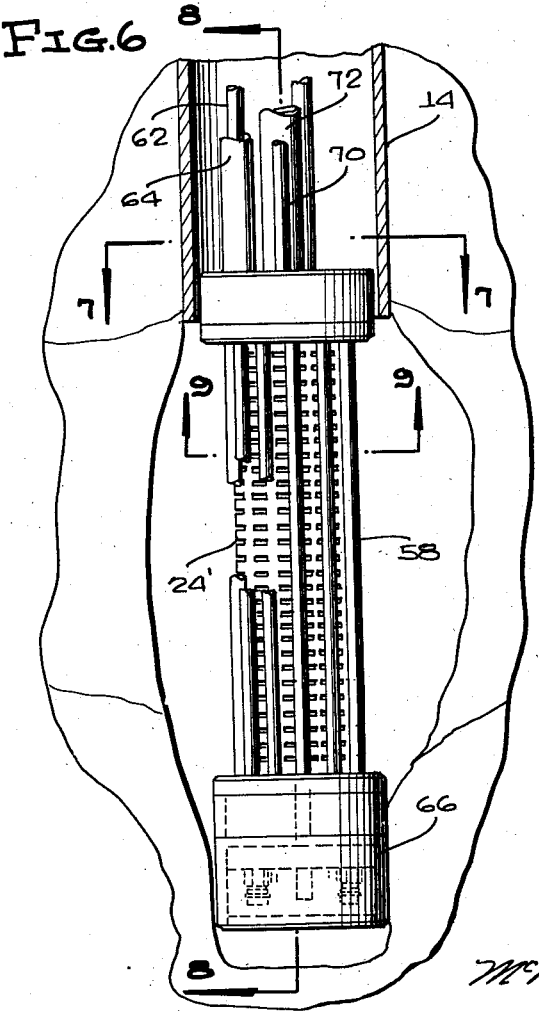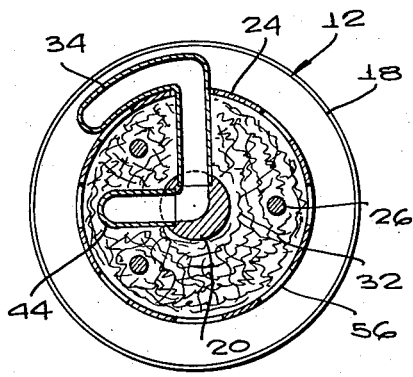

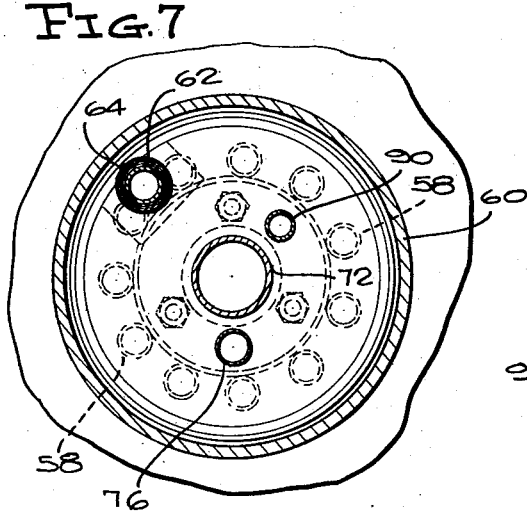
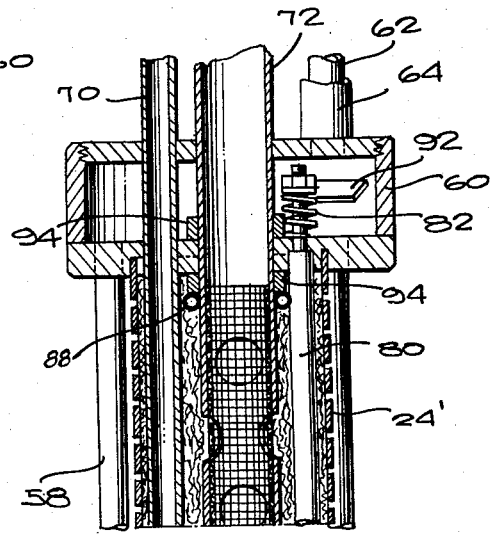
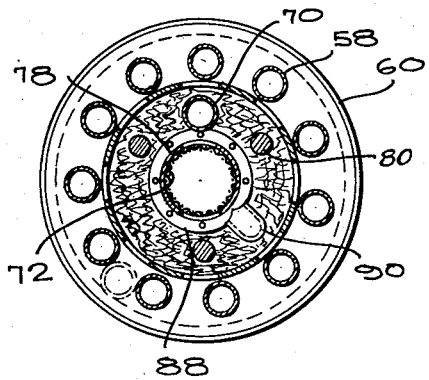
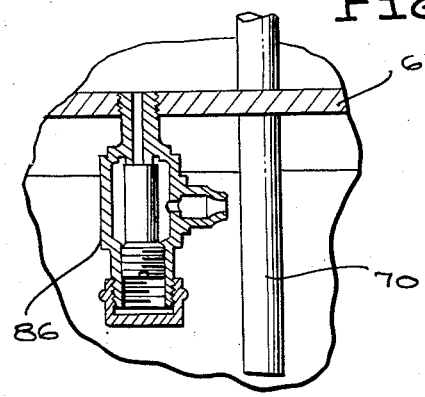
INVENTOR.
JOHN C. HENDERSON

United States Patent Office 2,911,047
Patented Nov. 3, 1959

2,911,047

APPARATUS FOR EXTRACTING NATURALLY OCCURRING DIFFICULTLY FLOWABLE PETROLEUM OIL FROM A NATURALLY LOCATED SUBTERRANEAN BODY

John C. Henderson, Omaha, Nebr.

Application March 11, 1958, Serial No. 720,575

5 Claims. (Cl. 166—61)

The present invention relates to an apparatus for extracting naturally occurring difficultly flowable petroleum oil from a naturally located subterranean body.

An object of the present invention is to provide an apparatus for extracting naturally occurring difficultly flowable petroleum oil from subterranean reservoirs which lends itself to economical production and recovery of petroleum oil of the heavy lube type which normally is viscous, thick, and heavy and normally cannot be produced in paying quantities.

Another object of the present invention is to provide an apparatus for extracting naturally occurring difficultly flowable petroleum oil from subterranean reservoirs in flowable petroleum oil from subterranean reservoirs in which equipment presently in use is subject to frequent clogging and the frequent formation of paraffin or asphalt on the equipment.

A further object of the present invention is to provide an apparatus for extracting naturally occurring petroleum oil from subterranean reservoirs which is sturdy in construction, one simple in structure, and one highly effective in action.

These and other objects and advantages of the present invention will be fully apparent from the following description when taken in conjunction with the annexed drawings, in which:

Figure 1 is a view in section of a portion of the roof strata, showing the apparatus of the present invention installed upon the lower end of a string of well tubing in an oil well;

Figure 2 is a sectional view, on an enlarged scale, taken on the line 2—2 of Figure 1;

Figure 3 is a sectional view, on an enlarged scale, taken on the line 3—3 of Figure 1;

Figure 4 is a sectional view taken on the line 4—4 of Figure 2;

Figure 5 is a sectional view taken on the line 5—5 of Figure 2;

Figure 6 is a view in elevation of a modified form of the apparatus according to the present invention;

Figure 7 is a sectional view, on an enlarged scale, taken on the line 7—7 of Figure 6;

Figure 8 is a sectional view, on an enlarged scale, taken on the line 8—8 of Figure 6;

Figure 9 is a sectional view, on an enlarged scale, taken on the line 9—9 of Figure 6; and Figure 10 is a sectional view, taken on the line 10—10 of Figure 8 and on an enlarged scale.

Referring in greater detail to the drawings in which like numerals indicate like parts throughout the several views, the apparatus of the present invention is shown, in a first form, in Figures 1 to 5, inclusive, and is designated generally by the reference numeral 12.

The apparatus 12 comprises a heat applying and petroleum extracting unit for insertion through a well tubing, as at 14 in Figure 1, into a naturally located subterranean body, as at 16. The unit consists in a base 18 having a post 20 rising from the central portion thereof, and a header 22 arranged above and in vertical spaced relation with respect to the base 18. An outer hollow perforated shell member 24 is interposed between and has its upper and lower ends supported in the header 22 and the base 18. A plurality of tie rods 26, arranged in spaced relation, extend between the base 18 and the header 22 and serve to connect the base 18, the header 22, and the member 24 together. One such tie rod 26 is shown in Figure 2.

An inner hollow shell member 28 is positioned within and extends longitudinally through the outer member 24 and has its lower end supported on the base 18 with the portion adjacent the upper end extending through the header 22. The upper end portion of the post 20 is received within the lower end portion of the inner member 28 for securement of the unit to the member 28.

The inner member 28 is the pump tube of the pumping apparatus and is provided in its lower end portion with a plurality of ingress openings 30 arranged in spaced relation therealong.

A filter element 32 is interposed between the inner member 28 and the outer member 24 and extends about the inner member 28 and bridges the openings 30.

Heat applying means is arranged in heat exchange relation with respect to the outer member 24 for heating the area of the body surrounding the unit to a temperature to convert the petroleum to a flowable state. Specifically, this heat applying means consists in a helically coiled pipe 34 extending about the exterior of the outer member 24, as shown in Figure 2, the pipe 34 being connected to a source of heated fluid under pressure. This source is shown in Figure 1 and includes a pump 36, a reservoir 38, and heater unit 40 connected by a suitable pair of conduits 42 and 44 to the upper and lower ends of the pipe 34.

A cylindrical screen 46 is positioned within the lower end portion of the inner member 28 and also bridges the openings 30 provided therein.

The conduit 42 is provided with insulation as at 48 in Figure 2 for conserving the heat in the liquid flowing down through the conduit 42 to the pipe 34. The up pipe or return conduit 44 is not provided with insulation and serves to radiate heat to the inside of the well tubing 14 to thereby transfer heat to the oil being pumped upwardly in the pump tube by the conventional pumping apparatus shown in Figure 1 and designated generally by the reference numeral 50.

A hollow dispensing ring 52 surrounds the upper end portion of the section of the inner member 28 within the unit and below the header 22 and is connected by a further conduit 54 to a source of solvent fluid under pressure, such source not being shown as not being a part of the present invention.

The perforations in the outer member 24 are slotted as designated by the reference numeral 56 in Figures 4 and 5.

In Figures 6 to 10, inclusive, a modified form of the present invention is shown in which there are a plurality of upstanding pipes 58 arranged in spaced relation about the exterior of the perforated outer member, designated by the reference number 24'. The upper ends of the pipes 58 are connected in communication with the interior of the header box 60 which is connected by a conduit 62 to a source of fluid heat under pressure, such as was heretofore described with reference to the first form of the invention and illustrated in Figure 1. Insulation 64 surrounds the conduit 62.

The lower ends of the pipes 58 are connected in communication with the interior of the upper section of a base block 66 having a horizontally disposed partition 68 dividing the block 66 into upper and lower sections.

An up pipe or conduit 70 extends through the header box 60 and into the lower section of the base box 66 and has its lower end open and positioned with its end above the bottom of the base block 66. The pump tube 72 constitutes the inner member arranged concentrically within the outer member 24' and having spaced openings 74 therealong, the openings 74 being bridged by a filter element 76 and also by a screen cylinder 78.

A plurality of tie rods 80 each having compression springs 82 on their end portions secure the header box 60 to the base block 66. A nipple 84 connects the top plate of the base block 66 to the interior of the pump tube 72 and has threaded into its lower end a steam-air trap 86. A steam-water trap 87 has its upper end threaded in the partition 68, as shown in detail in Figure 10.

A hollow dispensing ring 88 surrounds the portion of the pump tube 72 below the header box 60 and is connected by a conduit 90 to a source of fluid under pressure for supplying a flushing liquid or medium to the filter element 76 when the latter should become clogged with oil flow obstructing impurities.

In operation, using the heat applying unit shown in Figures 1 to 5, the unit is secured by a pair of collars 94 to the lower end portion of the pump tube 28 with the collars over and under the header 22, as shown in Figure 2. The lower open end of the tube 28 is seated on the post 20 which serves as a centering pin. The pump tube 28 is then lowered through the well tubing 14 to a position in which the heat applying unit is within the body of strata containing naturally occurring difficultly flowable petroleum oil. Hot fluid, heated by the heater unit 40, is then forced by the pump 36 into the insulated down pipe or conduit 42 and into the helically coiled pipe 34, returning to the surface through the uninsulated up pipe or conduit 44. The fluid is recirculated through the reservoir 38 into the heater unit 40.

The cylindrical outer member 24 serves to reflect the heat from the pipe 34 to the strata and to thereby raise the temperature of the strata surrounding the bottom hole so that the oil in the strata flows readily through the openings in the outer member 24, through the filter element 32, and into the interior of the pump tube 28 where it is acted upon by the pumping equipment and raised to the surface of the earth. The heat radiated from the uninsulated conduit 44 warms the pump tube 28 to a temperature sufficient to keep the heated oil from cooling or congealing within the pump tube 28.

When the heat applying unit shown in Figures 6 to 10, inclusive, is employed, the unit is secured by the collars 94 to the pump tube 72, as above described, and the pump tube 72 is lowered into the well tubing 14. Steam is generated by the heater unit 40 and is forced by the pump 36 into the down pipe or conduit 62 into the header box 60 where it is deflected by the plate 92 into the upper open ends of the pipes 58. Any air entrained in the condensing steam as removed from the chamber 67 in the upper end of the base block 66 through the steam air trap 86 into the nipple 84 and thence into the pump tube 72. The condensate then flows through the steam-water trap 87 into a sump chamber 89 in the lower portion of the base block 66 from where it is pumped to the surface by the up-pipe or conduit 70. The outer member 24' reflects the heat of the pipes 58 and heats the oil strata to the point where oil will flow therefrom, through the outer member 24', through the filter element 76 and into the pump tube 72 for recovery therefrom by the conventional pumping equipment.

Using either of the heat applying units above described, when the filter element becomes clogged with impurities, a flushing liquid or medium may be pumped into the conduit 54 and dispensed through the dispensing ring 52 or the dispensing ring 88 into the respective filter element for flushing therefrom the impurities, acids, corrosive elements which are either naturally or purposely introduced into such filter elements. The diluent fluids used to flush the filter elements are recovered through the respective pump tube for filtering or reuse, as desired.

When acids are introduced into the strata for acid fracturing purposes, neutralizing fluids may be used to clear the filter elements of such acids and to thereby eliminate to a large extent attack on the pumping equipment employed in the well tubing. The employment of the apparatus of the present invention is therefore seen to effectively increase oil production with the lowering of production costs when employed to extract petroleum oil of a difficultly flowable type from a naturally located subteranean body of strata containing the same.

What is claimed is:

1. In an apparatus for extracting naturally occurring difficultly flowable petroleum oil from a naturally located subterranean body containing same, a heat applying and petroleum oil extracting unit adapted to be connected to the lower end portion of a pump tube and adapted to be inserted through a well tubing into a naturally located subterranean body containing difficultly flowable petroleum oil, said unit comprising a base, a header arranged above and in vertical spaced relation with respect to said base, an outer hollow perforated member interposed between and having the upper and lower ends supported in said header and base, an inner hollow member positioned within and extending longitudinally through said outer member and having the lower end supported in said base and having the portion adjacent the upper end extending through and exteriorly of said header, said inner member being provided with a plurality of ingress openings extending therealong, a filter element extending about said inner member and bridging said openings thereof, heat applying means arranged in heat exchange relation with respect to said outer member for heating the area of said body surrounding said unit to a temperature to convert the petroleum oil to a flowable state, and a source of heated fluid connected to said heat applying means for heating the area of said body surrounding said unit to a temperature to convert the petroleum oil to a flowable state.

2. In an apparatus for extracting naturally occurring difficultly flowable petroleum oil from a naturally located subterranean body containing same, a heat applying and petroleum oil extracting unit adapted to be connected to the lower end portion of a pump tube and adapted to be inserted through a well tubing into a naturally located subterranean body containing difficultly flowable petroleum oil, said unit comprising a base, a header arranged above and in vertical spaced relation with respect to said base, an outer hollow perforated member interposed between and having the upper and lower ends supported in said header and base, an inner hollow member positioned within and extending longitudinally through said outer member and having the lower end supported in said base and having the portion adjacent the upper end extending through and exteriorly of said header, said inner member being provided with a plurality of ingress openings extending therealong, a filter element extending about said inner member and bridging said openings thereof, a pipe arranged in heat exchange relation with respect to said outer member, and a source of heated fluid connected to said pipe for heating the area of said body surrounding said unit to a temperature to convert the petroleum oil to a flowable state.

3. In an apparatus for extracting naturally occurring difficultly flowable petroleum oil from a naturally located subterranean body containing same, a heat applying and petroleum oil extracting unit adapted to be connected to the lower end portion of a pump tube and adapted to be inserted through a well tubing into a naturally located subterranean body containing difficultly flowable petroleum oil, said unit comprising a base, a header arranged above and in vertical spaced relation with respect to said base, an outer hollow perforated member interposed between and having the upper and lower ends supported in said header and base, an inner hollow member positioned within and extending longitudinally through said outer member and having the lower end supported in said base and having the portion adjacent the upper end extending through and exteriorly of said header, said inner member being provided with a plurality of ingress openings extending therealong, a filter element extending about said inner member and bridging said openings thereof, a pipe helically coiled about the exterior of said outer member, and a source of heated fluid connected to said pipe for heating the area of said body surrounding said unit to a temperature to convert the petroleum oil to a flowable state.

4. In an apparatus for extracting naturally occurring difficultly flowable petroleum oil from a naturally located subterranean body containing same, a heat applying and petroleum oil extracting unit adapted to be connected to the lower end portion of a pump tube and adapted to be inserted through a well tubing into a naturally located subterranean body containing difficulty flowable petroleum oil, said unit comprising a base, a header arranged above and in vertical spaced relation with respect to said base, an outer hollow perforated member interposed between and having the upper and lower ends supported in said header and base, an inner hollow member positioned within and extending longitudinally through said outer member and having the lower end supported in said base and having the portion adjacent the upper end extending through and exteriorly of said header, said inner member being provided with a plurality of ingress openings extending therealong, a filter element extending about said inner member and bridging said openings thereof, a plurality of upstanding pipes arranged in spaced relation about the exterior of said outer member, and a source of heated fluid connected to said pipes for heating the area of said body surrounding said unit to a temperature to convert the petroleum oil to a flowable state.

5. In an apparatus for extracting naturally occurring difficultly flowable petroleum oil from a naturally located subterranean body containing same, a heat applying and petroleum oil extracting unit adapted to be connected to the lower end portion of a pump tube and adapted to be inserted through a well tubing into a naturally located subterranean body containing difficultly flowable petroleum oil, said unit comprising a base, a header arranged above and in vertical spaced relation with respect to said base, an outer hollow perforated member interposed between and having the upper and lower ends supported in said header and base, an inner hollow member positioned within and extending longitudinally through said outer member and having the lower end supported in said base and having the portion adjacent the upper end extending through and exteriorly of said header, said inner member being provided with a plurality of ingress openings extending therealong, a filter element extending about said inner member and bridging said openings thereof, a pipe arranged in heat exchange relation with respect to said outer member, a source of heated fluid connected to said pipe for heating the area of said body surrounding said unit to a temperature to convert the petroleum oil to a flowable state, and means for applying a flushing medium to the exterior of said inner member.

References Cited in the file of this patent

UNITED STATES PATENTS

| | | |
|---|---|---|
| 71,144 | Dean | Nov. 19, 1867 |
| 1,354,757 | Popcke et al. | Oct. 5, 1920 |
| 2,349,536 | Bancroft | May 23, 1944 |
| 2,444,754 | Steffen | July 6, 1948 |
| 2,444,756 | Steffen | July 6, 1948 |
| 2,832,417 | Ford | Apr. 29, 1958 |